April 7, 1964  J. E. MARTENS  3,127,788
POSITION-RETAINING DEVICE
Filed Dec. 29, 1960  2 Sheets-Sheet 1

INVENTOR.
JACK E. MARTENS
BY W. E. Recktenwald
K. E. Walden
ATTORNEY

April 7, 1964 J. E. MARTENS 3,127,788
POSITION-RETAINING DEVICE
Filed Dec. 29, 1960 2 Sheets-Sheet 2

INVENTOR.
JACK E. MARTENS
BY W. E. Recktenwald
K. E. Walden
ATTORNEY

United States Patent Office 3,127,788
Patented Apr. 7, 1964

3,127,788
POSITION-RETAINING DEVICE
Jack E. Martens, Gary, Ind., assignor to The Anderson Company, a corporation of Indiana
Filed Dec. 29, 1960, Ser. No. 79,255
4 Claims. (Cl. 74—586)

This invention relates generally to retaining or holding mechanisms and more particularly is directed to a manual position-retaining mechanism having an improved linear movement and braking device therefor.

The invention is particularly adaptable for use in chairs having tiltable or reclining backs and for this reason is described within such a setting; however, the mechanism has other uses and is in no way limited because of this present disclosed application of the invention. For instance, the invention has utility as an adjustor for use on a reclining bed.

Many types of linear actuators or positioning devices for use with the reclining backs of chairs are available on the market and employ, for instance, a rack and detent, nut and actuated screw, rod and clamping device or a hydraulic system. In many instances these devices cause a great deal of difficulty and are, therefore, the subject of constant improvement and refinement. Quite often when failure occurs in the ratchet and detent or clamping type actuator device, the back of the chair is locked in the position of failure or creeps to the completely reclined position and cannot be moved until repaired. In the hydraulic type actuators, fluid leakage is a constant problem not only because of damage to fabrics and other physical surroundings but once the hydraulic fluid has escaped from the cylinder, control is lost and the back will creep to a reclining position.

In seats on buses, automobiles and aircraft, for example, it is desirable to have a seat with a back portion which is adjustable to any angular position and which, in case of mechanical failure of the adjustor or position device, is useable in the partially reclined position or is movable to the vertical position and there useable while not permitting reclining movement. This is to say, in most cases of mechanical failure of the improved adjusting mechanism, the back will not fall to the completely reclined position as in prior devices, but can be used in the partially reclined position or can be moved to and used in the vertical position.

It is, therefore, a principal object of this invention to overcome the disadvantages of the prior art and to provide an improved position-retaining or holding mechanism.

Another object of this invention is to provide a position-adjusting mechanism employing a screw-nut arrangement associated with a braking or holding device.

Still another object of this invention is to provide a position-retaining mechanism of an extenuator type wherein is provided a braking or holding device and means to control said braking device.

Another object of this invention is to provide a position-retaining mechanism of an extenuator type wherein is provided a holding device which permits relative movement in one direction but is releasably braked in the other direction.

Another object of this invention is to provide a mechanism for use in holding a seat back in desired angular position against force tending to pivot it backward; but which will permit the seat to be moved to the upright position with only a slight force.

A further object of this invention is to provide a mechanism for use in holding a seat-back in desired angular position and will, if mechanical failure of the mechanism should occur, permit the back to be manually returned to a useable vertical position.

A still further object of this invention is to provide a position-retaining mechanism wherein a preloaded spring is used to actuate the mechanism in one direction upon release of a brake.

Yet another object of this invention is to provide a position-retaining mechanism that is simple in construction and operation.

Other objects of this invention will become apparent from the following description hereinafter set forth along with the accompanying drawings.

Figure 1:
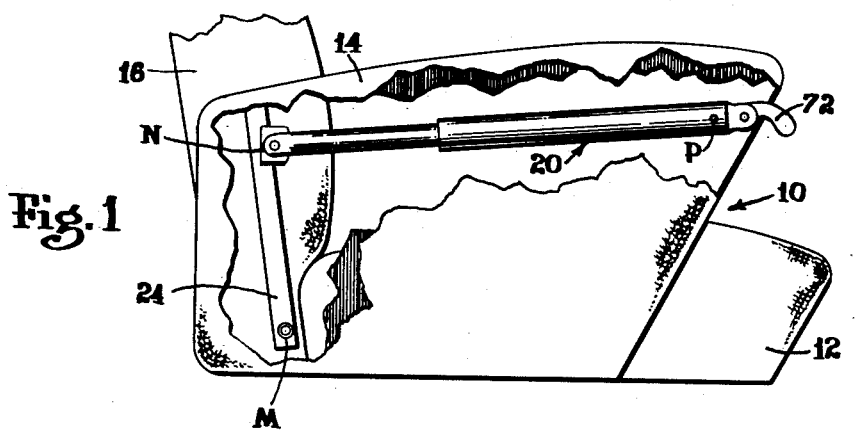
FIGURE 1 is a partially cut-away side view of a seat employing one form of the position-retaining mechanism, and wherein the arm portion is fixed with respect to the seat portion.

In referring to the drawings, like reference numerals designate similar elements or parts throughout the several views. In FIGURE 1, the numeral 10 generally designates a chair comprised of a seat portion 12, arm rest portion 14, and a pivotal back portion 16, all of which provides a setting for the present invention.

In FIGURE 1 the seat 12 and arms 14 are relatively fixed, and the back 16 is pivotally attached to the seat structure at a pivot M. The position-retaining mechanism designated by the numeral 20 is pivotally attached near the right end to the frame structure of arm 14 at pivot P, and at the other end to the frame structure 24 of back 16 at pivot N; and by this arrangement, the extension or retraction of mechanism 20 controls the angular position of the back 16 with respect to seat 12 and arm 14 as the back pivots or tilts about M.

Figure 2:
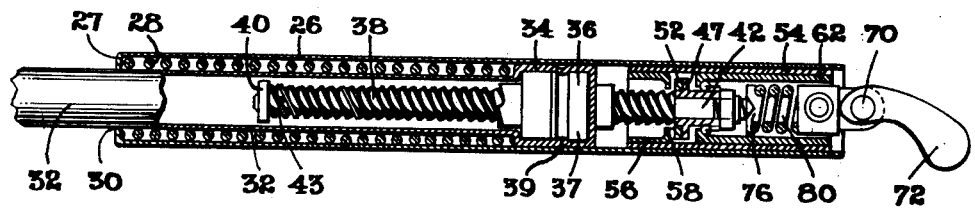
FIGURE 2 is a side view in partial section looking in the same direction as FIGURE 1, and showing the brake in nonholding position.
Figure 3:
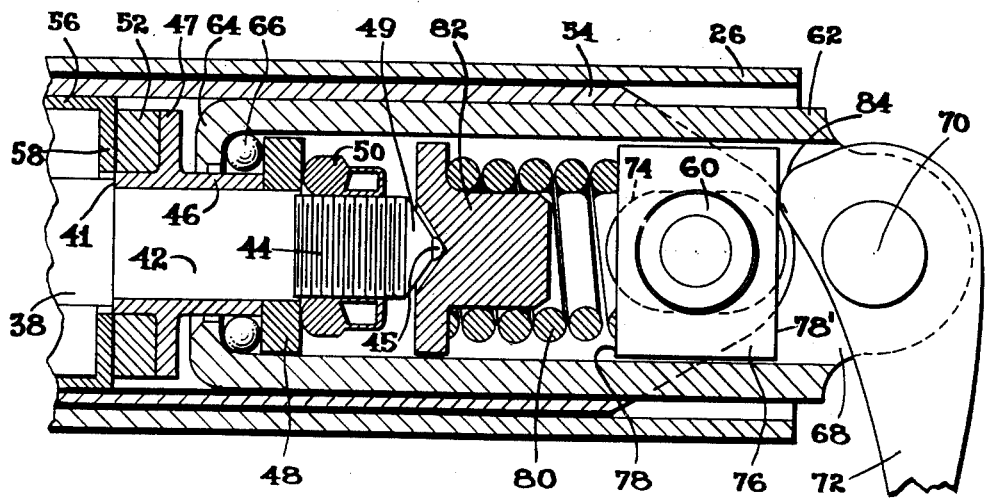
FIGURE 3 is an enlarged sectional view of the mechanism at the right-hand end of FIGURE 2, but showing the brake in holding position.

The details of one form of the position-retaining mechanism 20 are best disclosed in FIGURES 2 and 3. An elongate outer casing 26 of tubular form has provided at one end an inturned shoulder 27, adapted to support an end of a compression spring 28, and provide an opening 30 to receive a tubular member 32 in telescopic relationship. Tubular member 32 is pivotally attached at one end to frame 24 as at N of back 16, while the other end of member 32 has an enlarged portion 34 which lies within and is in slidable engagement with the inner walls of cylindrical casing 26. The enlarged portion 34 of member 32 may be integral therewith or attached thereto. Said portion 34 is adapted to fixedly receive one part of a nut member 36, and has a shoulder which serves as an abutment or a seat for the other end of compression spring 28. The nut member 36 can be any one of the types shown in my U.S. Patent 2,924,112, in the Wise U.S. Patent 2,938,401, in the Russell U.S. Patent 2,446,-393, or of the type commonly referred to as Acme nuts or recirculating ball nuts as long as the nut operates with a minimum of friction loss in cooperation with the relatively steep threads of the screw.

A screw member 38 having external threads of appreciable axial lead is telescopically received within a portion of the elongate tubular member 32, and is in operative engagement by means of said external threads with the nut member 36 whereby the screw 38 is free for relative axial and rotational movement with respect to said nut 36. In the form of nut 36 illustrated, a ring member 37 is crimped at 39 in the enlarged portion 34 of the tubular member 32 so that said ring 37 of the nut moves with the tubular member 32 in a longitudinal direction relative to casing 26. A washer 40 of nylon or other material is attached to the end of screw 38 that lies within the tubular member 32, and serves as a guide to keep the end of the screw 38 concentrically aligned with member 32 as they rotatably slide one within the other. A stop pin 43 is positioned through the end of the screw 38 in close proximity to the washer 40 and in the path of movement of the nut 36 so as to limit the extent of movement of the screw relative to the nut in one direction. The other end of the screw 38 extends beyond the nut member 36 and is provided with a cylindrical nonthreaded portion 42 of reduced diameter, and terminates finally in a screw-threaded portion 44. Cylindrical portion 42 may, in addition, be provided with longitudinal splines or a keyway to nonrotatably receive a brake sleeve 46 having a radially extending flange 47. Said sleeve 46 is axially secured in fixed position against a shoulder 41 (formed by the different diameter portions 38 and 42) by a race member 48 and a nut 50 threaded on the screw portion 44. The extreme right end of screw 38 beyond the threaded portion 44 is conically shaped at 49 and contains a seat for a bearing 45 for a purpose to be hereinafter described. A high-friction brake liner material forms a brake shoe 52 which is concentrically arranged about sleeve 46, and is bonded or otherwise secured to an axial face of the flange 47.

A cylindrical sleeve 54 is fixedly secured within the outer casing 26 and is provided at one end with an inturned cup-shaped member 56 having an internal flange 58 defining an opening to receive therethrough the aforementioned screw 38. Since the sleeve 54 with its internal flange 58 is secured in fixed relationship with casing 26, it forms a surface to act as a complementary brake face for selective engagement with the brake shoe 52 on flange 47 of sleeve 46.

A hollow pin 60 extends diametrically through both the casing 26 and the sleeve 54 and secures them together in fixed relationship. Within the sleeve 54 and in sliding concentric relationship therewith is a second sleeve 62 which is provided at its inner end with an inturned annular flange portion 64. It is to be noted, as best shown in FIGURE 3, that race 48 and portion 64 cooperate to confine thrust balls 66 therebetween in thrust-bearing arrangement. Sleeve 62 has a pair of diametrically opposed extensions or bifurcations 68 at its other end adapted to receive therebetween a second pin 70 to serve as a pivot for a hand-operated cam lever 72. An elongate slot 74 shown in dotted lines in FIGURE 3 is provided through each of the opposed walls of movable sleeve 62 to receive the hollow pin 60 and to permit limited relative axial movement between the movable sleeve 62 and the fixed cylindrical sleeve 54. Surrounding the pin 60 and positioned within the walls of sleeve 62 is a bearing block 76 with at least two oppositely facing flat surfaces 78 and 78' which serves as a force-transmitting member between cam lever 72 and the conical or tapered end 49 of screw 38.

A compression spring 80 bears against surface 78 of bearing block 76 and against a thrust block 82 to urge screw 38 to the left as viewed in FIGURES 2 and 3.

Thrust member 82 is conically hollowed in part to receive end portion 44 of screw 38 in pivotal thrust relationship. The threaded end portion 44 terminates in the conical shape 49 and is provided with a spherical ball member 45 which serves as a low friction thrust bearing between screw 38 and thrust block 82. The ball 45 creates in effect a ball point contact on the axis of the screw about which the screw 38 rotates.

As screw 38 is biased to the left by compression spring 80, the brake shoe 52 bears against fixed flange 58 whereby no relative axial or rotary movement is permitted between screw 38 and sleeve 54 (and, therefore, between screw 38 and casing 26).

Whenever cam lever 72 is pivoted in a counterclockwise direction about the pivot 70, as viewed in FIGURE 3, a raised camming portion 84 of lever 72 is brought to bear against surface 78' of block 76; and inasmuch as block 76 is fixed with respect to pin 60 which pin 60 is fixed to sleeve 54 and casing 26, movable sleeve 62 and its extensions 68, pin 70, and cam lever 72 are moved to the right relative to casing 26 against the force of compression spring 80. As the lever 72 is pivoted in the counterclockwise direction, sleeve 62 acts through bearings 66, nut 50, the end 44 of screw 38, bearing 45 and block 82 to compress spring 80 against fixed block 76 and thereby moves the screw 38 and brake shoe 52 to the right to unseat the frictional braking engagement between said shoe 52 and said brake flange 58, whereupon screw 38 is free to rotate whenever an axial force is applied in either direction to nut 36. That is, with the brake 52 unseated, any forces acting to move the tubular member 32 into or out of casing 26 causes the nut 36 to apply a rotational force onto the screw 38, and since the screw 38 is free to rotate in the bearing 66 on the ball 45, the screw 38 will rotate in the nut 36 to permit axial movement of the member 32 relative to the casing 26.

The hollow pin 60, previously described, serves the additional function of pivotally attaching the position-adjusting mechanism 20 to the structure of the chair arm 14 as in P in the drawings.

Compression spring 28, relatively weaker than aforementioned spring 80, is positioned around tubular member 32 and within the outer casing 26 to bear in compression against flange 27 and against enlargement 34, of members 26 and 32 respectively. By this arrangement, nut 36 is normally urged to the right on screw 38 as viewed in FIGURE 2.

The operation of my position-retaining mechanism and its association with a reclining back will now be described. Mechanism 20, by reason of its pivotal attachment at 60 to the arm and at N to the back frame, as best seen in FIGURE 1, serves as a connector therebetween. With back 16 as shown in FIGURE 1 and with lever 72 in its normal released position, any counterclockwise pressure against back 16 will tend to want to move 32 with nut 36 to the left overcoming the tension of spring 28. Nut 36 would normally move to the left causing relative rotation of screw 38; however, this is prevented since the pull on screw 38 by member 32 and the pressure of spring 80 firmly seats brake members 52 and 58. Additional counterclockwise force against the back will not cause the back to recline, but will result in the brake holding more firmly against rotation of the screw 38. Lifting or counterclockwise movement of actuator lever 72 pulls sleeve 62 to the right and moves brake elements 52 free of the fixed brake face 58 whereby screw 38 is free for rotational movement about its axis within the bearing 66 and on the end ball 45, see FIGURE 2. Counterclockwise pressure against back 16 will now urge nut 36 to the left axially along screw 38 overcoming only the force of spring 28. The seat back will be free for continued backward movement until either the lever 72 is released or until nut 36 engages with stop pin 43, which is the fully retracted position of the back. Obviously the pin 43 could be so positioned as to stop the seat back at any selected position. When lever 72 is again released, screw 38 is braked and nut 36 with member 32 cannot move to a farther extended position thus holding the back 16 in the desired position.

As previously mentioned, the axial lead of the threads on screw 38 is relatively steep to permit the screw to freely rotate upon a slight axial force on nut 36.

When it is desired that the back be moved from a reclined position to a vertical position or any position therebetween, one of two methods may be employed. First, the braking elements 52, 58 may be released by an upward pull or counterclockwise movement of lever 72, thus freeing screw 38 for rotation whereupon tubular member 32 and nut 36 are free to be moved to the right or retracted position by the action of spring 28. Second, without a manipulation of lever 72, a slight force in addition to spring 28 tending to move the back to the vertical position will force tubular member 32 to the right and overcome the force of spring 80 to separate the brake elements 52, 58 from braking engagement, thereby permitting rotary movement of screw 38 and axial movement of nut 36 for retraction of the ends of the mechanism 20.

Figures 4, 5, 6:
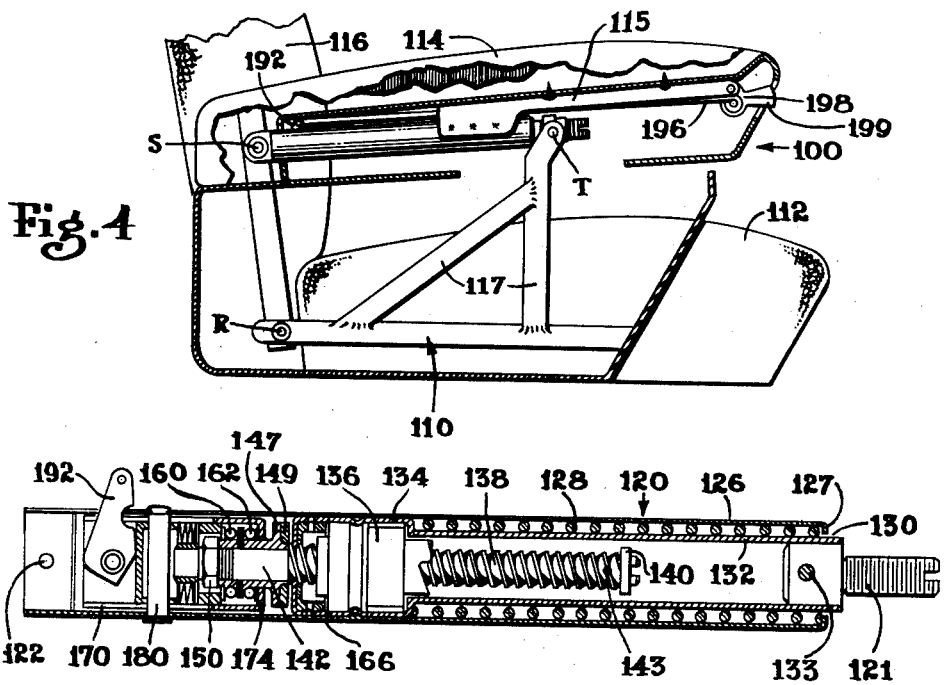
FIGURE 4 is a partially cut-away side view of a seat employing another form of the position-retaining mechanism wherein the arm portion which houses the mechanism is movable with respect to the seat and back portions.
FIGURE 5 is a slightly enlarged side view in partial section looking in the same direction as FIGURE 4, and showing the brake in nonholding position.
FIGURE 6 is an enlarged sectional view of the mechanism at the left-hand end of FIGURE 5, but showing the brake in holding position.

Another form of my position-retaining mechanism is illustrated in FIGURES 4, 5 and 6 wherein it is used with a chair designated generally at 100 having a frame 110 to which is pivoted at R a reclining back portion 116. An arm 114 is pivoted at S to the frame of the back portion 116 so as to move back and forth with said back portion 116 as said back is pivoted. A seat portion 112 is operatively carried by the frame 110 and remains stationary with the frame 110 when the back and arm are moved. The frame 110 has an upstanding brace structure 117 fastened thereto as by welding or the like. The top portion of the brace structure 117 is bifurcated and pivotally supports at T one end portion of the position-adjusting mechanism 120 which is pivotally attached at its other end portion by the pivot S on the frame of the back 116. A bracket 115 is fastened to the mechanism 120 as by welding or the like and has its other end portion fastened to the under part of the arm rest 114 so as to support the outer end of the arm. A bell-crank release lever 198 is pivotally attached to the bracket 115 at the front of the arm rest 114 with a handle portion 199 exposed for easy manipulation by a seat occupant. An actuating rod 196 is pivotally attached at one end to the center of the bell-crank lever 198 and is pivotally attached at its other end to a lever 192 extending from the position-adjusting mechanism for a purpose to be more fully described hereinafter.

As best illustrated in FIGURES 5 and 6, the position-retaining mechanism 120 has an outer casing 126 of elongate cylindrical form provided with a pair of aligned openings 122 or the like near one end portion through which a pivot is passed for pivotal attachment at S to the frame structure of the seat back 116. Said casing 126 is provided at its other end with a circumferentially inturned shoulder 127 defining an opening 130 to receive an elongate tubular member 132 in telescopic relationship. Member 132 has secured thereto at its exposed outer end an axially extending threaded bolt 121 which in conjunction with a nut (shown in FIGURE 4) is used for pivotal attachment by means of pin 133 to the seat frame 117 as designated at T. The other end of tubular member 132 has integrally formed therewith or secured thereto a radially enlarged section 134 which is slidably disposed within the casing 126 to fixedly receive a nut member 136 therein. The nut member 136 may be any one of the general types referred to above with respect to FIGURES 1–3 in describing nut member 36. Operatively received within nut 136 is an axially extending screw 138 concentrically positioned within casing 126 and member 132. Screw 138 has external threads of appreciable axial lead, and has attached to its one end a washer like member 140 adapted to serve as a guide in member 132. A stop pin 143 is positioned through the screw 138 in close proximity to the washer 140 and in the path of movement of the nut 136 so as to limit the relative axial movement of the nut on the screw.

The other end of screw 138 has an axially extending nonthreaded portion 142 of reduced diameter terminating in a threaded portion 144 which receives a nut 150. One brake member 151 is carried by said screw 138 and is comprised of an axially extending brake sleeve 146 positioned on the reduced portion 142. The brake sleeve 146 has a radially extending peripheral flange 147 to which is bonded a frictional brake material to form a brake surface or shoe 149. A pair of adjacent disc-shaped annular raceways 152 and 154 are positioned on said reduced portion 142 and are held in abutting relationship with each other and with one end face of the brake sleeve 146 by a cylindrical-shaped spacer 148. It is to be noted that additional raceways 156 and 158 are axially spaced along extension 142 of the screw by slidably embracing spacer 146 and sleeve 148, respectively, to form a pair of complementary raceways with a plurality of ball thrust-bearing elements 160 being disposed between raceways 152 and 156 and a second set of ball thrust-bearing elements 162 being disposed between 154 and 158. The nut member 150 is threaded on portion 144 to maintain the brake sleeve 146, spacer 148 and the raceways with their associated thrust-bearing elements 160, 162 positioned on the extension 142 of screw 138.

Secured within the casing 126, as by means of pins 168, is a complementary braking member 166 which is bored out so as to form a braking flanged end 167 with a braking surface 164 facing in an axial direction therefrom. The screw 138 passes through the bored portion of the member 166 in such a way as to position the brake shoe 149 in normally aligned relation with said brake surface 164.

Axially slidable within casing 126 is a cylindrical sleeve 170 having a pair of diametrically opposed longitudinal slots 172 extending from the left end in FIGURE 6 to beyond the midpoint thereof. The sleeve 170 has on its right-hand end in FIGURE 6 an inturned annual flange 174 extending to a position between the raceway 158 and the brake flange 147. An enlarged pin 180 is fixed to the casing 126 and extends diametrically across the inside of said casing 126. Said pin 180 is slidably received in said longitudinal slots 172 of sleeve 170 so as to limit movement of said sleeve 170 to axial movement with respect to the casing 126.

A cup-shaped member 176 having a bottom portion 178 is positioned in the casing 126 by said pin 180 passing through aligned apertures 181 formed in the base and part of the walls of said cup 176. Abutting against lip end 182 of member 176 is one of a series or stack of "Belleville" springs 184 which, in their compressed condition, urge the member 176 against pin 180 and also urge an annular retaining member 186 against the raceway 156, which in turn urges the ball bearings 160 against raceway 152. Since raceway 152 is immovably connected with the screw 138, the urging of the springs 184 will urge the screw 138 and its brake shoe 153 to the right in FIGURE 6 and thereby seat said brake 151 against said braking surface 164 on the fixed braking member 166. With the brake 151 locked to casing 126 the screw 138 will not rotate and thereby the position-retaining mechanism will not elongate.

Outer casing 126 and tubular member 132 enclose a compression spring 128 which is concentrically disposed within the space therebetween. The spring 128 normally abuts against inturned flange 127 of casing 126 at one end and against the enlargement 134 of tubular member 132 at the other end to bias member 132 toward a position on the left-end portion of the screw 138, which is in effect the position in which the seat back 116 is upright with respect to the seat 112. With the brake 151 released the spring 128 urges the nut to the right on the screw 138 so as to foreshorten the position-adjusting mechanism and raise the seat back, absent of any outside forces on the seat back.

The operation of the form of my invention shown in FIGURES 4–6 is much the same as that disclosed in FIGURES 1–3. Mechanism 120 acts as a connector between the seat frame 117 and the reclining back 116 (shown in FIGURE 4), and its braked position in extension or retraction determines the position of the back. With hand lever 198 in its normal inoperative position and the cam lever 192 in its most counterclockwise location, mechanism 120 is locked against linear extension. Any force tending to move back 116 in a counterclockwise direction would exert a pull on casing 126 relative to tubular member 132, but extension of the two members would be prevented by the brake block 165 carried by casing 126 being positively pulled into engagement with the brake 151 carried by the oppositely pulled nonrotatably held screw 138 in the tubular member 132. Any counterclockwise force against back 116 would only hold the brake members fast with no resulting axial or relative movement between screw 138 and nut 136.

Counterclockwise movement of hand lever 198 will produce clockwise movement of cam lever 192 whereupon cam surface 195 will move sleeve 170, thrust bearings 162, 160 and screw 138 to the left (FIGURE 6) against the action of springs 184 to unseat the brake elements 151 from the brake surface 164 to thereby permit free rotation of screw 138. The screw 138 will be permitted to freely move through the nut 136 whenever a relative axial force is applied to the casing 126 in one direction and to the tubular member 132 in the opposite direction as by leaning back against back portion 116 of the seat. Once the hand lever 198 is released, the brake members are again seated and further extension of members 126 and 132 is not possible.

Seat back 116 may be returned in a clockwise direction toward the vertical position in either of two ways. First, the lever 192 may be operated through the hand lever 198 to move the sleeve 170 to the left (FIGURES 5 and 6), thereby unseating the brake elements to permit rotation of screw 138 and axial movement of the screw relative to the nut 136 by the action of compression spring 128. That is, with no force being applied against the seat back 116 counterclockwise movement of the lever 198 will unseat the brake 151 to permit the spring 128 to drive the screw 138 to the right through the nut 136 in FIGURE 6 and thereby move the seat back 116 to the upright position. Second, without touching hand lever 198 and by merely exerting a pull on the back 116 of the seat in a clockwise direction, a force will be applied through casing 126 and sleeve 170 to the screw 138 to unseat the brake 151 from surface 164 and thereby permit axial movement of the screw 138 along the nut 136 for retraction of the mechanism.

The back can be reclined only by first releasing the hand lever and then applying a backward force; however, to raise the back from a reclining position to the vertical, or any position therebetween, it is only necessary for the seat occupant to pull forward on the back.

In any instance, should the mechanism fail, the back can always be moved to and held in the vertical position or is maintained in the position of failure. That is, the seat back 116 will not creep to the fully reclined position and have no holding or supporting ability at any point except at the fully reclined position, as is the case in seats heretofore in use.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A position-retaining device comprising in combination; a pair of axially spaced adjustable members each adapted to be attached to respective members which are to be fixedly retained in relative position, one of the adjustable members being telescopically received within the other member in nonrotative relationship, said one adjustable member fixedly carrying a nut member, the other of said adjustable members rotatably carrying a screw member axially disposed therein and being operatively received within the nut member, said screw member having threads of appreciable axial lead whereby axial force applied to either adjustable member relative to the other will cause rotation of the screw member and repositioning of the adjustable members, resilient means encircling a substantial portion of the one adjustable member and received within the other adjustable member normally urging the adjustable members into a retracted position, releasable holding means operative between the screw and said other adjustable member for restraining rotation of said screw relative thereto, second resilient means concentrically disposed within said other member and stronger than the first-mentioned resilient means operative in one direction to urge the holding means into operative contact whereby the adjustable members will be fixedly restrained from movement to an extended position but permit movement to the retracted position responsive to a force above a predetermined value, and release means operative with the holding means to overcome the second resilient means whereby the adjustable members are returned to their retracted position by the action of the first-mentioned resilient means.

2. A position-retaining mechanism comprising in combination;
   a first elongate tubular member telescopically and slidably received within a second elongate tubular member in nonrotatable relationship,
   a nut member fixedly carried on one end of the first tubular member for linear movement within the second tubular member,
   a first spring member surrounding the first tubular member and within the second tubular member for urging the first and second members to an axially retracted position,
   a screw member having a helically threaded portion of appreciable axial lead in operative relationship with the nut member and rotatably mounted within the second tubular member whereby an axial force applied between said tubular members causes relative rotation of said screw member,
   said screw member carrying a first brake member affixed thereto and having an axially facing surface,
   a second brake member fixedly carried within the second member and having an opposed surface in cooperative proximity to the first surface,
   a second spring member positioned within the second elongate member and normally urging the first brake member axially into braked position with the second brake member whereby the screw member is rotatably restrained with respect to the second elongate member to thereby restrain relative axial movement of the elongate member,
   and release means carried by the second elongate member to disengage the first and second brake members whereby the screw member is permitted free rotational movement in response to axial forces applied between said tubular members.

3. A seat adjustor comprising in combination:
   first and second relatively movable members each having a portion adapted to be connected to respective relatively movable parts which are to be retained in one of infinite positions,
   said first and second members being coaxially disposed for relative coaxial linear movement therebetween,
   said second member including rotatable screw means having threads of appreciable axial lead,
   said first member telescopically disposed within said second member and fixedly carrying nut means receiving said screw means for relative rotary and linear movement upon an axially directed force being applied between said first and second members,
   engaging means between said second member and said screw means preventing rotation of said screw means relative to said second member upon an axially directed force being applied between said first and second members tending to move them in one relatively opposite direction, resilient means operative with the first and second members urging them in a direction opposite to said one-mentioned direction, means operable upon manipulation to disengage the engageable means whereby said first and second members are free for relative linear displacement.

4. A seat adjustor comprising in combination:

first and second relatively movable members having portions adapted to be connected to movable parts which are to be restrained in one of a plurality of infinite positions, said first relatively movable member coaxially and telescopically received within said second relatively movable member, a third member coaxially disposed within said second member for limited relative linear movement therein, said third member rotatably supporting a screw for cooperation with nut means fixedly carried on said first member, the threading of said screw and nut means being relatively steep so that an axially directed force between said first and second members causes rotation of said screw and permits relative axial adjustment of said first and second members, said screw and said second member having axially disposed facing breaking surfaces adapted to be urged together upon an axially directed force being applied in one direction between said first and second members for preventing rotation of said screw relative to said third member, means operative to move said third member and said screw means axially within said second member for releasing said spaced-apart breaking surfaces so as to release said screw for rotation thereby permitting said first and second members to be moved to another relative position and there restrained in relative position.

References Cited in the file of this patent

UNITED STATES PATENTS

| | | |
|---|---|---|
| 2,579,305 | Cushman | Dec. 18, 1951 |
| 2,856,179 | Hogan | Oct. 14, 1958 |
| 2,857,775 | Ochtman | Oct. 28, 1958 |
| 2,882,040 | Cottrell | Apr. 14, 1959 |
| 2,966,321 | Blattner | Dec. 27, 1960 |
| 3,046,055 | Martens | July 24, 1962 |